United States Patent [19]

Eissens

[11] Patent Number: 5,056,440
[45] Date of Patent: Oct. 15, 1991

[54] WATER WEEDING TOOL

[76] Inventor: Alvin J. Eissens, 10517 Laws Dr., Mazomanie, Wis. 53560

[21] Appl. No.: 576,355

[22] Filed: Aug. 31, 1990

[51] Int. Cl.$^5$ .............................................. A01B 1/16
[52] U.S. Cl. ........................................ 111/7.1; 239/601
[58] Field of Search ................... 111/7.1, 7.2, 7.3, 95; 239/532, 592, 597, 601

[56] References Cited

U.S. PATENT DOCUMENTS

| | | | |
|---|---|---|---|
| 1,598,811 | 9/1926 | Ferrin | 111/7.1 |
| 1,836,449 | 12/1931 | Colvin | |
| 2,157,915 | 7/1937 | Olson | 111/7.1 |
| 2,333,727 | 9/1942 | Lucas | 111/7.1 |
| 2,655,408 | 5/1950 | Williams | 239/592 |
| 2,808,013 | 10/1957 | Dean | 111/7.1 |
| 2,875,713 | 1/1955 | Shoffner | 111/7.1 |
| 3,118,402 | 1/1964 | Nelson | 111/7.1 |
| 3,166,034 | 1/1965 | Haroldson et al. | 111/7.3 |
| 3,303,800 | 2/1967 | Young | 111/7.1 |
| 3,326,306 | 6/1967 | Weir | 175/207 |
| 4,466,490 | 8/1984 | Eckels | 171/50 |

Primary Examiner—Randolph A. Reese
Assistant Examiner—Tim Aberle
Attorney, Agent, or Firm—Lathrop & Clark

[57] ABSTRACT

An apparatus for removing rooted plants from the soil is disclosed which has an elongated tube adapted for attachment to a source of pressurized water. A valve controls the flow of water through the apparatus. A nozzle is formed in one end of the tube which has a flattened section of tubing with two opposed segments for dispersing water in a narrow planar flow pattern. The top segment has a notch which is spaced from the bottom segment such that the pressurized water flowing through the tube is deflected upwardly by the bottom surface through the notch, creating a flow pattern with a generally perpendicular portion extending perpendicularly and outwardly from the planar flow pattern and the bottom segment. The weeding apparatus preferably has side slots located between the two opposed surfaces, forming a nozzle exit with a horizontal opening between the two surfaces with the slots defining openings angular to the horizontal opening. The side slots serve to direct the pressurized water outwardly in a broad, generally planar flow for dispersing the water around the subterranean portions of a plant. The flow of water from the nozzle has components directed downwardly and outwardly towards the roots of the plant to facilitate complete removal of the roots of a plant from the ground.

11 Claims, 4 Drawing Sheets

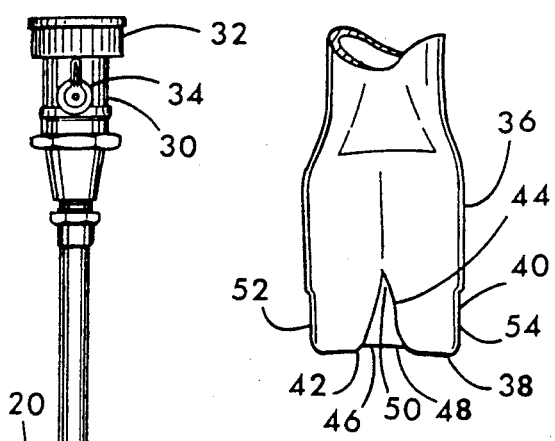
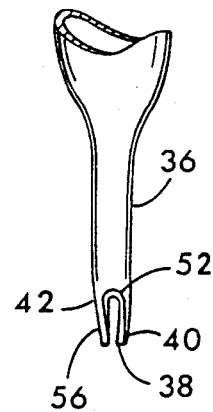
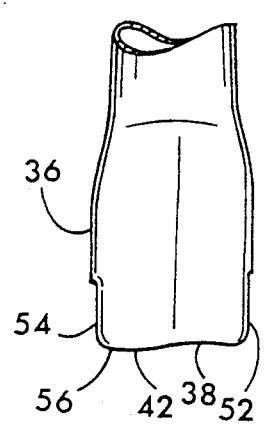
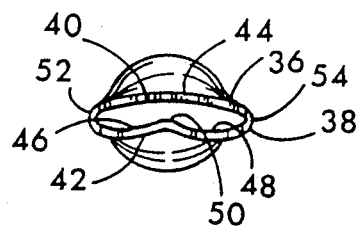
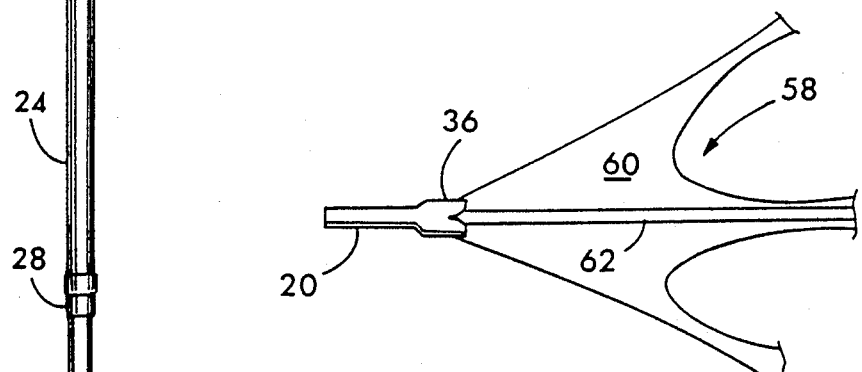
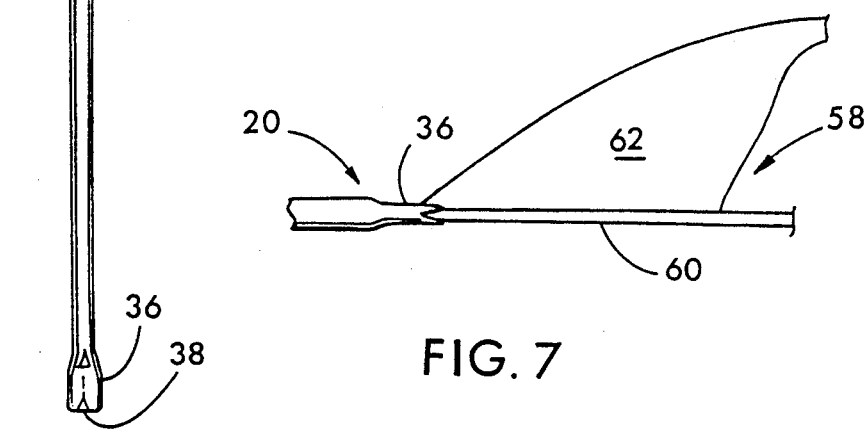

WATER WEEDING TOOL

FIELD OF THE INVENTION

The present invention relates generally to devices for removing vegetation from the soil, and to such devices which employ pressurized water in particular.

BACKGROUND OF THE INVENTION

In the management of a garden or a lawn or turf, it is necessary to remove those undesired plants which compete for sun and nutrients and which distract from the desired appearance of the cultivated vegetation. Many weeds, particularly those having rhizomes such as dandelions, nut grass, plantian, thistles and others, are deeply rooted. If the top portions of such weeds are removed, as is generally the case when the weeds are pulled from the ground, the weeds are able to grow back from the portion of the roots which remain in the ground. To prevent a particular weed from returning the weed must be completely destroyed or removed. Various poisons and herbicides are available for destroying weeds, but herbicides can damage desired plants as well as being toxic to humans and pets. To avoid the use of herbicides, to permanently remove a weed it is best to extract the entire plant including all roots.

The entire weed may be extracted by digging down through the full extent of the roots with a spade or excavation tool, but such an operation of necessity will disturb the desired vegetation surrounding the weed.

If the soil in which the weed is rooted is flooded, the roots may be pulled from the resulting mud while leaving a majority of the soil in place. This flooding may be obtained by inserting a common garden hose into the ground surrounding the weed. However, this operation is imprecise, destructive to neighboring vegetation, and wasteful of water.

Hydraulic weeding tools consisting of cylindrical tubes connected to a garden hose offer slightly more control. A lengthy tube may be pressed downwardly into the ground to loosen the soil surrounding deeply placed roots. These hydraulic weeders usually feature a nozzle for the escape of the pressurized water which is either directed exclusively downwardly or exclusively perpendicular to the tubing. The downwardly directed streams of water aid the insertion of the tool into the ground, but are not able to focus the water stream in the direction of the root of the undesired plant. Conversely, nozzles which direct the water flow onto the root of the weed perpendicular to the tube are more difficult to insert into the ground to the depths required. Furthermore, known hydraulic weeders loosen the soil in a general area surrounding the weed. This lack of direction means that more water than optimally required is injected into the soil.

What is needed is a weeding tool which directs a flow of pressurized water onto the subterranean root of an undesired plant in a controlled directional manner to facilitate insertion of the tool into the ground and quick removal of the plant without excessive consumption of water.

SUMMARY OF THE INVENTION

An apparatus for removing weeds from the soil of this invention has an elongated tube adapted for attachment to a source of pressurized water. A valve controls the flow of water through the apparatus. A nozzle is formed in one end of the tube which has a flattened section with two opposed segments, the flattened section having a narrow cross section in a first transverse direction and a broad cross section in a second transverse direction perpendicular to the first transverse direction for dispersing water in a planar flow pattern. The top segment has a notch which is spaced from the bottom segment such that water flowing through the nozzle is deflected upwardly by the bottom segment through the notch, creating a perpendicular flow pattern which emerges from the top segment of the nozzle at right angles to the planar flow pattern which emerges between the top and bottom segments of the nozzle. The bottom segment is preferably comprised of two concave surfaces meeting along a line spaced from a notch in the top surface. The weeding apparatus preferably has side slots located between the two opposed surfaces, forming a nozzle exit with a horizontal opening between the two segments and the side slots defining openings angular and coplanar with the horizontal opening. The slots serve to direct the pressurized water outwardly in a broad, generally planar flow for dispersing the water around the subterranean portions of a weed.

It is an object of the present invention to provide a weeding tool which permits the effective removal of an entire plant, including the roots, from the ground.

It is also an object of the present invention to provide a weeding tool with a directional spray of water for quick removal of weeds.

It is a further object of the present invention to provide a hydraulic weeding tool which is conservative of water and which will operate at low pressures.

An additional object of the present invention is to provide a weeding tool which allows the efficient direction of water around the roots of a weed.

It is a yet further object of the present invention to provide a water supplied device for extraction of subterranean portions of plants.

Further objects, features, and advantages of the invention will be apparent from the following detailed description when taken in conjunction with the accompanying drawings.

BRIEF DESCRIPTION OF THE DRAWINGS

In the drawings:

FIG. 1 is a top plan view of the weeding tool of the present invention.

FIG. 2 is an enlarged top view of the nozzle of the weeding tool of FIG. 1.

FIG. 3 is a left side elevational view of the nozzle of FIG. 2.

FIG. 4 is a bottom plan view of the nozzle of FIG. 2.

FIG. 5 is a front elevational view of the nozzle of FIG. 2.

FIG. 6 is a schematic top view of the flow pattern emitted from the nozzle of FIG. 2.

FIG. 7 is a schematic side elevational view of the flow pattern of FIG. 6.

DETAILED DESCRIPTION OF THE PREFERRED EMBODIMENT

Figure 8:
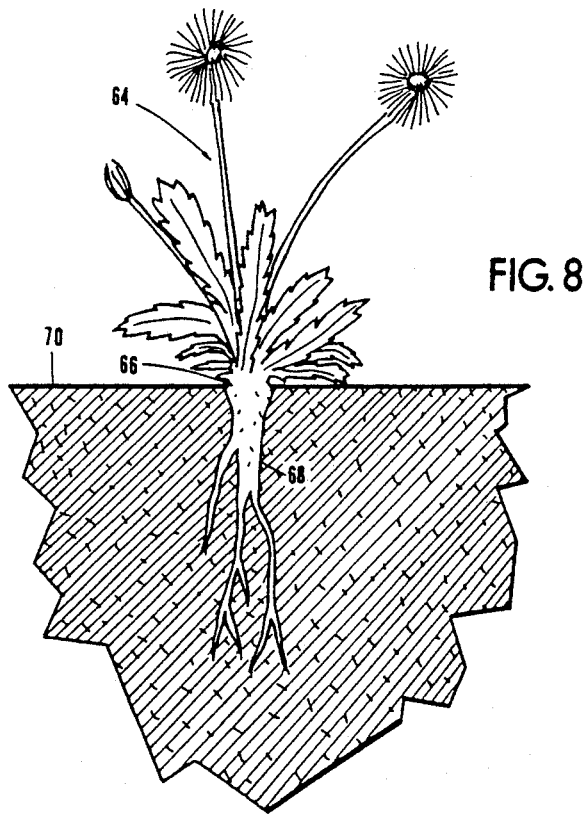
FIG. 8 is a side elevational view of a deeply rooted undesired plant, with the ground broken away in section.

Referring more particularly to FIGS. 1–12 wherein like numbers refer to similar parts, the weeding tool 20 of this invention is shown in FIG. 1. The tool 20 has a cylindrical tube 22 with an internal passageway for the flow of water therethrough. The tube is preferably comprised of two sections 24, 26, the first section 24 being of larger diameter than the second section 26 and the two sections 24, 26 being joined by a conventional fitting 28. The first, larger, section 24 carries the water with acceptable pressure losses, while the smaller section 26 achieves a desirable increase in water velocity. The tube may be molded or extruded plastic such as PVC, or cast or formed stainless steel or other suitable metal, but for economy and ease of forming it is preferably formed of copper tubing. The tube 22 is adapted for attachment to a conventional garden hose 29 (shown in FIGS. 9–12) which will provide a source of pressurized water, by a body housing 30 with an internally threaded cap 32. The body housing 30 is screwed or otherwise connected to the first section 24 of the cylindrical tube 22 and preferably has a valve assembly 34 located therein for controlling the flow of water through the weeding tool 20. Usually a washer (not shown) is included in the cap 32 to provide a tight seal with the garden hose 29 to prevent leakage.

A nozzle 36 with an exit 38 for the escape of the pressurized water admitted into the tool 20 from the hose 29 is located in the lower portion of the second section 26 of the cylindrical tube 22.

The tube 22 should be long enough to allow the nozzle 36 to be inserted in the ground at a depth great enough to reach deeply extending roots. In the illustrated preferred embodiment the first section 24 of the tube 22 is approximately 15 inches long and the second section 26 of the tube is approximately 12 inches long.

At the fitting 28, between the first section 24 and the second section 26, the velocity of the water passing through the tool 20 is increased due to the decrease in the cross-sectional area of the tube 22.

The nozzle 36, best shown in FIGS. 2–5, may be a separate attachment to the cylindrical tube 22, but is preferably formed as an integral part of the second section 26. The nozzle is particularly formed to disperse the water flowing through the tool 20 in a directional and controlled manner.

The nozzle 36 is flattened to approximatley one quarter of the original diameter of the second section 26 tubing. The flattened section of tubing results in two opposed segments in the nozzle 36, a top segment 40 and a bottom segment 42. The flattened section thus has a narrow cross section in a first transverse direction and a broad cross section in a second transverse direction perpendicular to the first transverse direction.

The top segment 40 has portions defining a V-shaped outwardly opening notch 44. In a preferred form the notch extends approximately one-half the width of the nozzle 36 into the top segment 40 and is approximately one quarter as wide as the nozzle 36 at the exit 38.

The bottom segment 42 of the nozzle 36 has two concave surfaces 46, 48 formed therein which meet along a line 50 which is parallel to the axis of the tube 22 and which is spaced from the center of the notch 44. The concave surfaces 46, 48 act to deflect water into the notch 44.

As best shown in FIG. 3, portions of the nozzle 36 define side slots 52, 54 between the two opposed segments 40, 42. The slots 52, 54 extend into the nozzle 36 approximately to the same depth as the notch 44. The slots 52, 54 are substantially coplanar with the opening between the opposed segments 40, 42 of the nozzle 36, and define openings which are angled, preferably perpendicular to the horizontal opening between the top segment 49 and bottom segment 42. The slots 52, 54 permit the water flowing through the tool 20 to escape outwardly in a broadened generally planar flow which enables the water to be directed around the subterranean portions of a weed.

Preferably, to provide additional deflection of water through the notch 44, the front portions 56 of the bottom segment 42 may be inclined slightly towards the top segment 40 as shown in FIG. 3.

The general effect of the nozzle 36 on the flow of water 58 is illustrated schematically in FIGS. 6 and 7. As best shown in FIG. 7, the opposed segments 40, 42 of the nozzle 36 direct the water 58 outwardly in a narrow planar flow pattern 60 which is generally flat. As shown in FIG. 6, the slots 52, 54 allow the water 58 to extend outwardly from the nozzle 36 in a generally broadening flow pattern.

The bottom segment 42 in conjunction with the notch 44 in the top segment 40 direct a portion of the water upwardly from the bottom surface 42 into a perpendicular flow pattern 62 which extends perpendicularly and outwardly from the bottom segment 42 and the planar flow 60.

The schematic illustrations of FIG. 6 and 7 illustrate the flow pattern of the tool 20 when directed into open air. The flow of the water 58 will not be so extensive or in such a precise pattern when the nozzle 36 is inserted into the ground, but the pattern shown in FIGS. 6 and 7 serves to illustrate the directional nature of the flow produced by the nozzle 36.

The operation of the weeding tool 20 is illustrated in FIGS. 8–12. A plant 64 is illustrated as a dandelion which is exemplary of the common weeds encountered in a lawn or garden. The dandelion 64 has a base 66 from which extend roots 68 into the soil forming the ground 70. The roots 68 of the dandelion are wide at the base 66 but are of decreasing thickness as they descend into the ground 70. As a result an attempt to pull the plant 64 out of the firm ground will result in portions of the roots 68 being left in the ground. These roots are able to restore the weed after a period of time. To avoid leaving significant portions of the roots 68 in the ground 70 when the plant 64 is extracted, the weeding tool 20 of this invention is employed.

Figure 9:
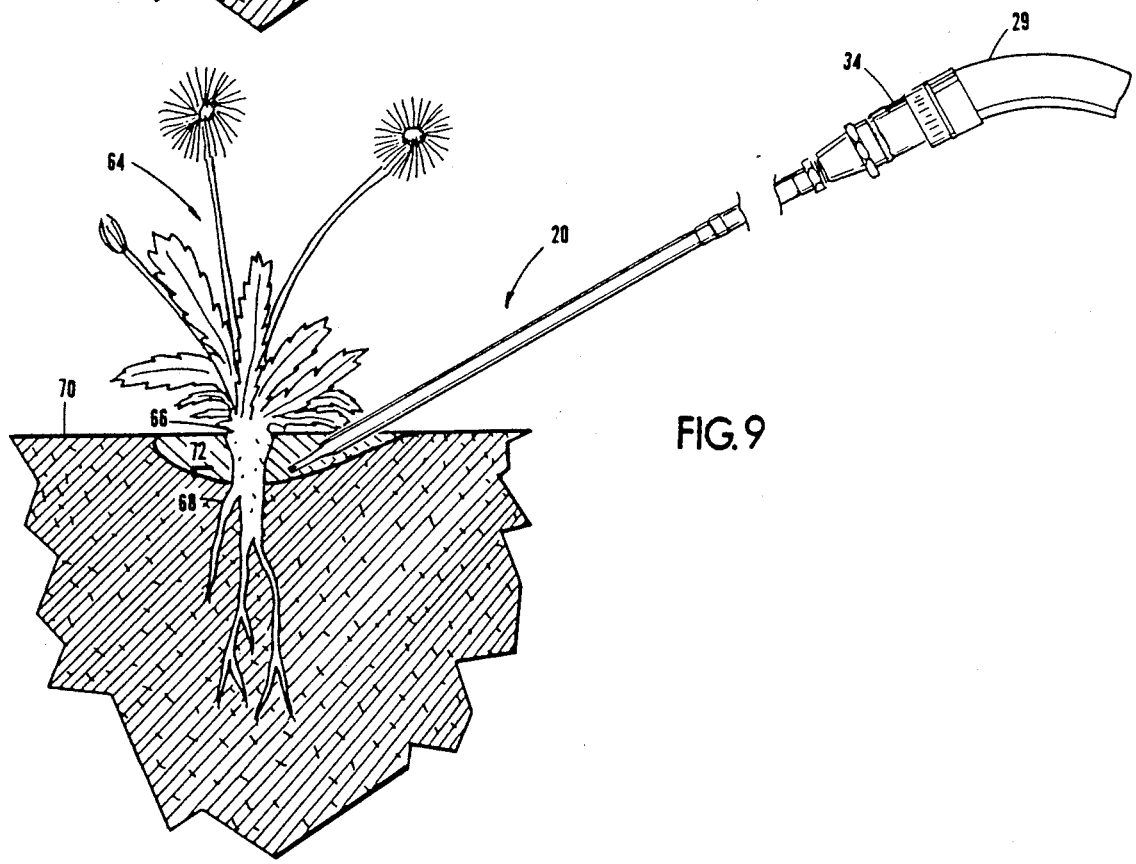
FIG. 9 is a side elevational view of the plant of FIG. 8 with the weeding tool of the present invention inserted at the base of the plant to loosen the soil therein.

First, as shown in FIG. 9, the valve 34 is opened to allow a flow of water 58 from the nozzle 36 of the tube 22 of the tool 20. The tool 20 is directed at the base 66 of the weed 64 to wash away approximately one inch of the soil around the base 66 to expose the roots 68 of the plant 64.

Figure 10:
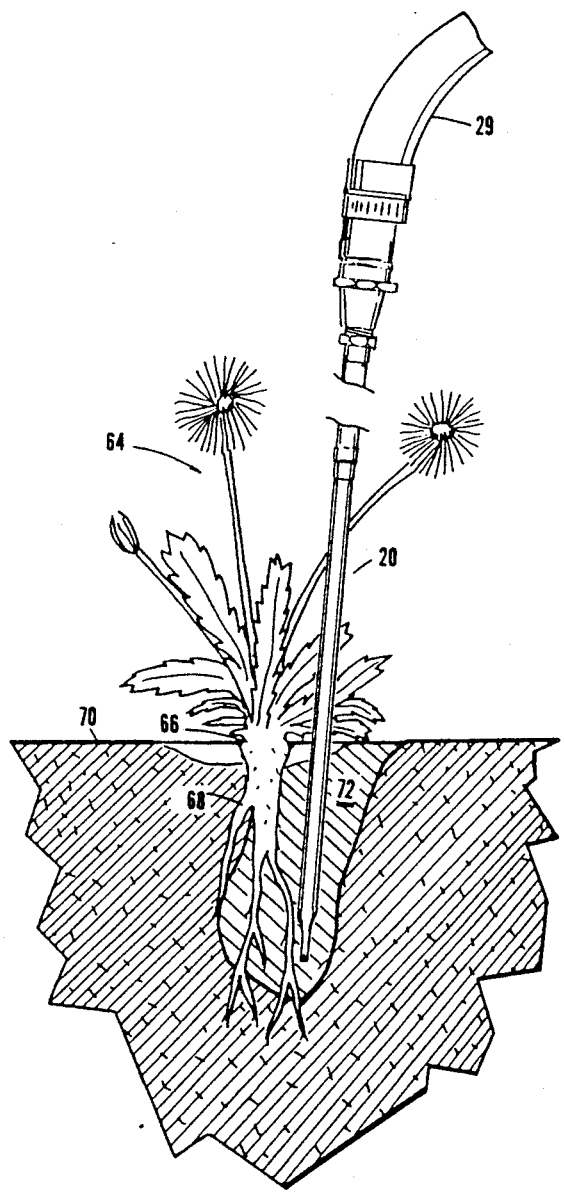
FIG. 10 is a side elevational view of the plant of FIG. 9 with the weeding tool of the present invention pressed downward along the depth of the root to loosen the soil therein.
Figure 11:
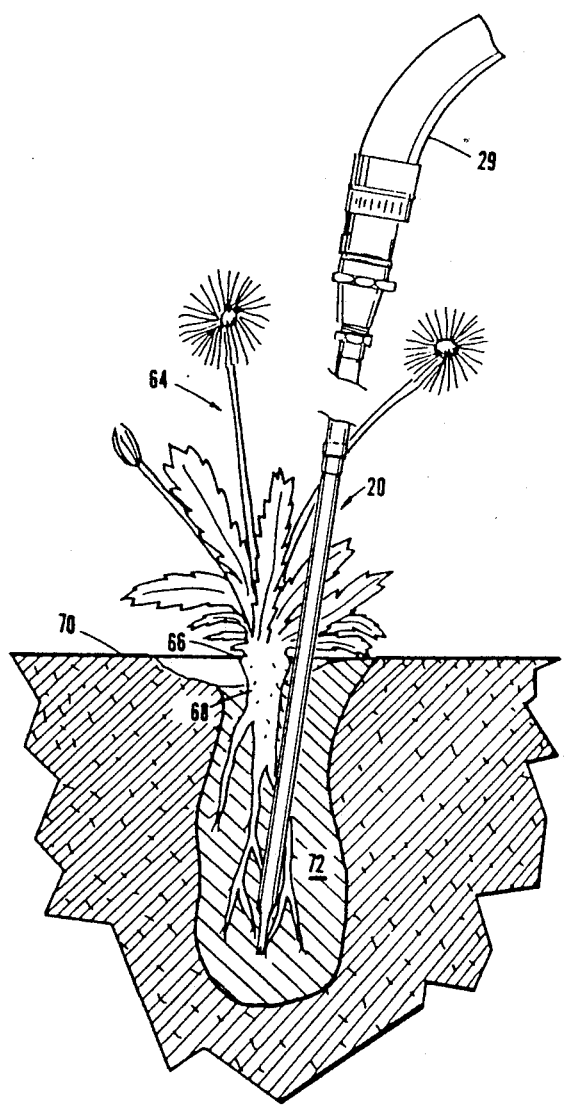
FIG. 11 is a side elevational view of the plant of FIG. 10 showing the weeding tool of the present invention inserted to the full depth of the plant's roots to loosen the roots of the plant.

With the base 66 of the plant 64 exposed, several insertions of the tube 22 may be made into the ground 70 to generally soak the ground in close proximity to the roots as shown in FIG. 10. The tool 20 is inserted into the ground 70 alongside the weed 64 so as not to cut the root 68 of the plant with the nozzle 36. Cutting of the root is undesirable as portions of root within the ground and not attached to the plant's base 66 will be more difficult to extract. Next, as shown in FIG. 11, the tube 22, with the notch 44 directed towards the root 68 of the plant 64, is pressed down into the ground 70 generally parallel to the roots and to the depth of the roots 68. Because of the directional flow of the water the particles of soil attached to the roots 68 will be loosened and the ground closely surrounding the weed 64 will be generally fluidized as shown by the shaded portions 72.

Figure 12:
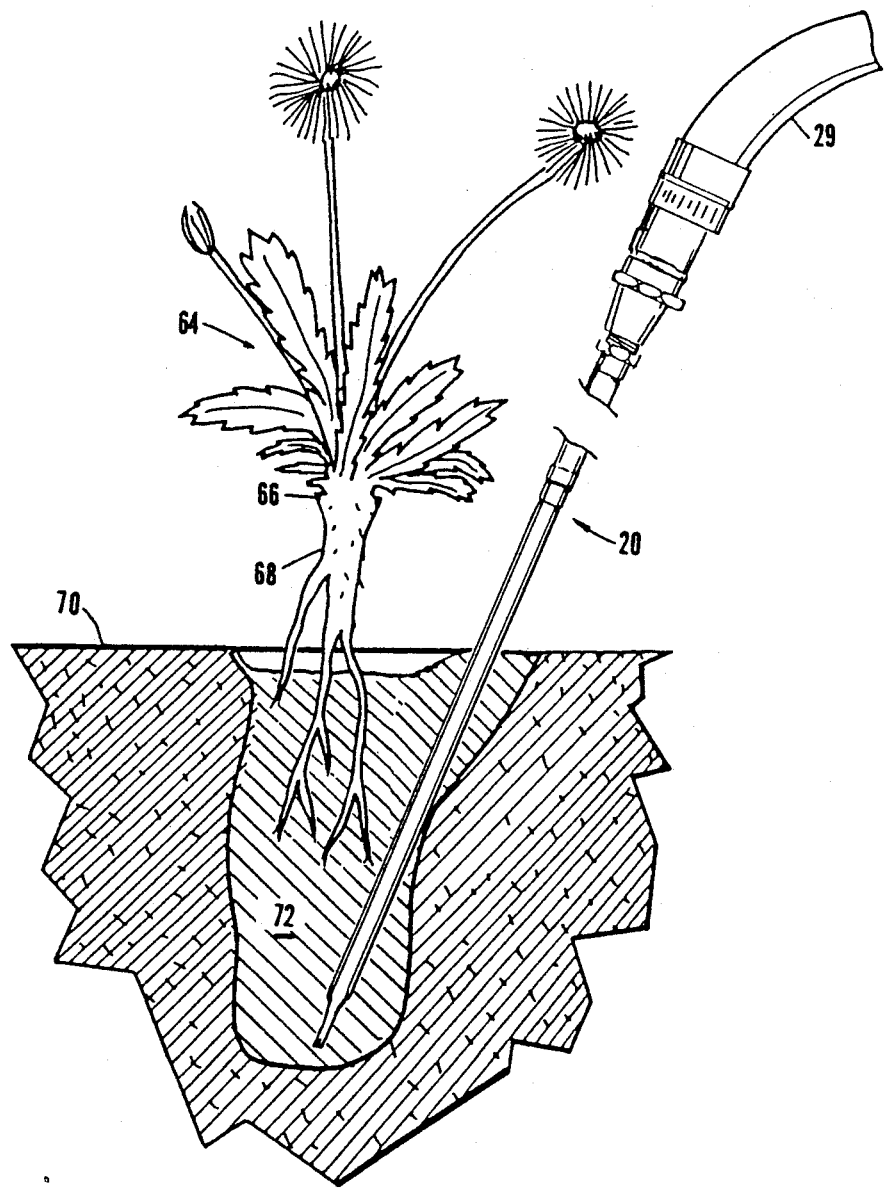
FIG. 12 is a side elevational view of the weed of FIG. 8 being removed from the soil loosened by the weeding tool of the present invention.

While the ground is thus fluidized the base 66 of the weed 64 may be grasped and the root 68 dislodged from the soil by pulling upwards. The response of the weeding tool to downward pressure will vary depending on the obstructions within the ground 70 and the position of the roots 68. This response is sensed by the user and permits the user to properly direct the flow of water from the nozzle 36 onto the roots 68 of the plant 64. When the ground has been sufficiently fluidized around the entire root of the plant 64 the user will feel the plant 64 move under applied pressure and the plant may be pulled from the ground 70 as shown in FIG. 12.

The nozzle 36 of the tool 20 is formed such that while water is dispersed downwardly to permit easy insertion of the tool up to its full depth into the ground, water is also directed outwardly towards the roots of the plant 64. Due to this directional dispersion of water, minimal damage is done to the ground and plants surrounding the removed plant. The flattened spray from the nozzle increases the effectiveness of the loosening of the soil which has been attached to the roots of the plant.

Once the plant 64 has been removed a cavity will remain in the ground which may be filled with soil and replanted with desired vegetation.

Because of the directional flow of water from the tool 20, the tool may be effectively operated with pressures commonly available from city mains or private well pumps. Water is conserved by directing the dispersed water primarily onto the roots of the plant, without having to soak the soil which is not immediately surrounding the plant.

It should be noted that the weeding tool of this invention may be formed to different dimensions to address the needs of removing a variety of plants under particular circumstances. For example, while the nozzle of the illustrated preferred embodiment is approximately one-half inch wide, a smaller nozzle, with a reduced flow rate of water, may be appropriate for weeding a very densely planted garden where damage to closely neighboring plants must be avoided. In such a case, a nozzle width of 3/16 inches would be preferable. A reduced nozzle size may result in a longer time to extract a plant.

It is understood that the invention is not confined to the particular construction and arrangement of parts herein illustrated and described, but embraces such modified forms thereof as come within the scope of the following claims.

I claim:

1. An apparatus for removing plants rooted in soil, comprising:
   a) an elongated tube adapted for attachment to a source of pressurized water;
   b) a valve for controlling the flow of water through the apparatus;
   c) a nozzle formed in one end of the tube which has a flattened section with two opposed segments and a notch formed in at least one segment, the opposed segments are spaced apart to define a gap having a narrow cross section in a first transverse direction and a broad cross section in a second transverse direction perpendicular to the first transverse direction for dispersing water in a planar flow pattern beneath the surface of the soil onto the roots of the plant to dislodge the plant from the soil.

2. The apparatus of claim 1 wherein the nozzle flattened section has top and bottom opposed segments and a notch opening toward the nozzle end is formed by portions of the top segment spaced from the bottom segment such that pressurized water flowing through the tube will be deflected upwardly by the bottom segment through the notch, creating a perpendicular flow pattern which emerges from the top segment of the nozzle at right angles to the planar flow pattern which emerges from between the top and bottom segments of the nozzle.

3. The apparatus of claim 2 wherein the bottom segment has two concave surfaces meeting along a line spaced from the notch in the top segment, wherein water is deflected into the notch by the concave surfaces.

4. The apparatus of claim 1 wherein the tube has a first section and a second section, and the first section is adapted for attachment to a source of pressurized water and the second section has a smaller diameter than the first section and has the nozzle formed therein.

5. The apparatus of claim 2 wherein the notch is V-shaped and is approximately one quarter as wide as the nozzle.

6. An apparatus for removing plants rooted in soil, comprising:
   a) an elongated tube adapted for attachment to a source of pressurized water;
   b) a valve for controlling the flow of water through the apparatus;
   c) a nozzle having a longitudinal axis along its axial length formed in one end of the tube which has a flattened section with two opposed segments of the same axial length, said opposed segments are spaced apart to define a gap having a narrow cross section in a first transverse direction perpendicular to said longitudinal axis and a broad cross section in a second transverse direction perpendicular to the first transverse direction and to said longitudinal axis for dispersing water in a planar flow pattern beneath the surface of the soil onto the roots of the plant to dislodge the plants from the soil wherein portions of the nozzle define axially directed side slots between the two opposed segments forming a nozzle exit with said gap between the two segments and the side slots defining openings angular to and coplanar with said gap, the slots serving to direct the pressurized water outwardly in a broadened, generally planar flow for dispersing the water around the roots of the plant.

7. A nozzle for attachment to a source of pressurized water for removing plants with roots from the soil, comprising a flattened section of tubing with spaced top and bottom opposed segments, the opposed segments being spaced apart to define an opening having a narrow cross section in a first transverse direction and a broad cross section in a second transverse direction perpendicular to the first transverse direction, for dispersing water in a narrow cross-sectional pattern, wherein a notch is formed by portions of the top segment spaced from the bottom segment such that pressurized water flowing through the tube will be deflected upwardly by the bottom segment through the notch, creating a perpendicular flow pattern which emerges from the top segment of the nozzle at right angles to the planar flow pattern which emerges between the top and bottom segments of the nozzle for directing water onto the roots of the plant in the soil.

8. The nozzle of claim 7 wherein the bottom segment has two concave surfaces meeting along a line spaced from the notch in the top, wherein water is deflected into the notch by the concave surfaces.

9. The apparatus of claim 7 wherein portions of the nozzle define side slots between the two opposed segments forming a nozzle exit with a horizontal opening between the two segments and the slots defining openings angular to the horizontal opening, the slots serving to direct the pressurized water outwardly in a broadened, generally planar flow for dispersing the water around the roots of the plant.

10. The apparatus of claim 7 wherein the notch is V-shaped.

11. The apparatus of claim 7 wherein the notch is approximately one quarter as wide as the nozzle.

* * * * *